(12) United States Patent
Lee et al.

(10) Patent No.: US 12,216,446 B2
(45) Date of Patent: Feb. 4, 2025

(54) BALLBAR TESTING TUNE-UP METHOD FOR MACHINE TOOL

(71) Applicant: NATIONAL YANG MING CHIAO TUNG UNIVERSITY, Hsinchu (TW)

(72) Inventors: Ching-Hung Lee, Hsinchu (TW); Shun-Fu Wu, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 557 days.

(21) Appl. No.: 17/451,924

(22) Filed: Oct. 22, 2021

(65) Prior Publication Data
US 2023/0043926 A1    Feb. 9, 2023

(30) Foreign Application Priority Data
Aug. 6, 2021  (TW) .................................. 110129167

(51) Int. Cl.
  *G05B 19/401*  (2006.01)
  *B23Q 17/22*  (2006.01)
  *B23Q 17/24*  (2006.01)
  *G05B 19/404*  (2006.01)

(52) U.S. Cl.
  CPC ........... *G05B 19/401* (2013.01); *B23Q 17/22* (2013.01); *G05B 19/404* (2013.01)

(58) Field of Classification Search
  CPC ..... G05B 19/401; G05B 19/404; B23Q 17/22
  See application file for complete search history.

(56) References Cited

U.S. PATENT DOCUMENTS

| | | | |
|---|---|---|---|
| 2004/0098243 A1* | 5/2004 | Kinsey | G06F 30/20 703/22 |
| 2016/0236313 A1* | 8/2016 | Pettersson | G01B 7/14 |
| 2021/0237218 A1* | 8/2021 | Kuo | B23Q 17/22 |
| 2021/0324955 A1* | 10/2021 | Zhu | F16H 3/76 |

FOREIGN PATENT DOCUMENTS

CN        110539020        * 12/2019

* cited by examiner

*Primary Examiner* — Mark A Connolly
(74) *Attorney, Agent, or Firm* — Rosenberg, Klein & Lee

(57) ABSTRACT

A ballbar testing tune-up method for machine tool includes the steps of letting a machine tool system execute a ballbar test; obtaining a phase characteristic and a peak-value characteristic; creating a Lagrange interpolation polynomial and inputting a servo controller parameter, a phase characteristic and a peak-value characteristic of the machine tool system each time when executing the ballbar test, and obtaining a proposed servo parameter. This method is simple and easy without incurring additional equipment costs, but just using existing equipment to find the proposed servo parameter quickly and input it into a machine tool system, so as to improve the response issue of a servo system and reduce manufacturing contour error to enhance the working precision of the machine tool system.

6 Claims, 19 Drawing Sheets

Backlash (μm)
  X        ▶ -0.9    ◀ 1.2
  Y        ▲ 1.5     ▼ 1.3

Reversal spikes (μm)
  X        ▶ 1.0     ◀ -2.5
  Y        ▲ 4.1     ▼ -6.2

Lateral play (μm)
  X        ▶ -2.2    ◀ -0.9
  Y        ▲ -0.3    ▼ 0.4

Cyclic error (μm)
  X        ↑ 0.5     ↓ 0.5
  Y        ↑ 0.8     ↓ 0.9

Other features
  Servo mismatch            0.01ms
  Squareness                24.2μm/m
  Straightness X            5.5μm
  Straightness Y            -3.0μm
  Scaling error X           114.2ppm
  Scaling error Y           147.5ppm Positional tolerance      76.5μm
  Best fit radius           100.0131mm
  Circularity               22.2μm

FIG.7c

Backlash (μm)
- X  ▶ −0.8   ◀ 0.7
- Y  ▲ 0.5   ▼ 0.4

Reversal spikes (μm)
- X  ▶ 0.1   ◀ 0.1
- Y  ▲ 2.1   ▼ 2.9

Lateral play (μm)
- X  ▶ −1.0   ◀ −2.4
- Y  ▲ 0.2   ▼ −0.4

Cyclic error (μm)
- X  ↑ 0.7   ↓ 0.7
- Y  ↑ 0.7   ↓ 0.3

Other features

| | |
|---|---|
| Servo mismatch | −0.01ms |
| Squareness | −12.4μm/m |
| Straightness X | 0.5μm |
| Straightness Y | 0.1μm |
| Scaling error X | 111.5ppm |
| Scaling error Y | 104.9ppm |
| Positional tolerance | 61.7μm |
| Best fit radius | 100.0108mm |
| Circularity | 5.9μm |

FIG.8a

Backlash (µm)
- X    ▶ -0.7   ◀ 0.9
- Y    ▲ 1.4   ▼ 1.6

Reversal spikes (µm)
- X    ▶ 1.1   ◀ -2.4
- Y    ▲ 4.7   ▼ 6.4

Lateral play (µm)
- X    ▶ -1.1   ◀ -3.6
- Y    ▲ 0.3   ▼ 0.0

Cyclic error (µm)
- X    ↑ 0.8   ↓ 0.8
- Y    ↑ 1.2   ↓ 0.7

Other features

| | |
|---|---|
| Servo mismatch | 0.00ms |
| Squareness | 26.3µm/m |
| Straightness X | 5.2µm |
| Straightness Y | -2.9µm |
| Scaling error X | 113.9ppm |
| Scaling error Y | 149.5ppm |

| | |
|---|---|
| Positional tolerance | 77.3µm |
| Best fit radius | 100.0132mm |
| Circularity | 22.8µm |

FIG.8c

Backlash (µm)
- X ▶ 0.9 ◀ 2.7
- Y ▲ 3.2 ▼ 3.4

Reversal spikes (µm)
- X ▶ 1.2 ◀ 0.9
- Y ▲ 3.3 ▼ 5.3

Lateral play (µm)
- X ▶ -0.2 ◀ -1.0
- Y ▲ 0.6 ▼ -0.6

Cyclic error (µm)
- X ↑0.5 ↓0.8
- Y ↑2.0 ↓2.2

Other features

| | |
|---|---|
| Servo mismatch | 0.01ms |
| Squareness | -14.3µm/m |
| Straightness X | -0.8µm |
| Straightness Y | 0.8µm |
| Scaling error X | 60.5ppm |
| Scaling error Y | 53.1ppm |
| Positional tolerance | 34.3µm |
| Best fit radius | 100.0057mm |
| Circularity | 25.7µm |

FIG.8e

BALLBAR TESTING TUNE-UP METHOD FOR MACHINE TOOL

FIELD OF THE INVENTION

The present invention relates to a ballbar testing tune-up method for machine tools, and more particularly to the ballbar testing tune-up method that obtains a phase characteristic and a peak-value characteristic by carrying a ballbar test and obtains a proposed servo parameter by a Lagrange interpolation polynomial, so that the method can be applied to a machine tool system, to improve performance and working precision.

BACKGROUND OF THE INVENTION

With the continuous development of the manufacturing industry, the requirement for the precision of finished products becomes increasingly higher. In the technology of smart machinery and manufacturing, predicting the manufacturing quality based on the conditions of the machine is an important subject for the development of the manufacturing industry.

The current computer numerical control (CNC) machine tool plays an important role in the manufacturing industry, and servo control systems even have key impacts to the industry and the effects of coordinating the track precision of feed axes to ensure good contour accuracy, and the control requirement of existing machine tools is also a method that concurrently takes high-precision manufacturing quality and high-speed processing into account. Servo parameters have significant impacts on the performance of CNC machine tools, so that the quick calibration of high-performance servo drive system is essentially required in precision manufacturing.

Therefore, the quick inspection and adjustment of the performance of the CNC machine tools are necessary tasks, and the most popular measuring instrument for machine tools is the Reinshaw double ball bar (DBB) measuring instrument, and a DBB is provided for obtaining the error origin information of the machine, and then operators make a necessary adjustment based on their experience by a trial and error method. However, the DBB not just incurs a high price only, but also consumes the time and cost for setting up the instrument and calibrating the instrument by a measuring center.

There are Two Main Methods for the Calibration of Machine Tools Through Servo Adjustment and Compensation, as Described Below:

1. An error measuring model adopts the non-contact measurement and uses a laser tracker to perform a ballbar test, and establish a measuring model to improve the limitations of the physical structure of the machine tool during a Double Ball Bar (DBB) measurement, and raise the servo mismatch problem occurred during the process of adjusting the system by a proposed controller parameter obtained from the DBB measurement in order to adjust the system servo mismatch problem.
2. Through the frequency domain analysis of control theory, different control structures are used to achieve the multi-axis dynamic matching and single-axis stability, or an adaptive controller or neuro-like compensation controller to improve the control precision of servers and study the impact of non-linear interference to feed systems. The compensation controller is used for compensation to adjust the precision of the machine tool.

However, the aforementioned methods require the additional compensation controller for experiments and modifications, which will increase the time and equipment cost significantly.

In view of the aforementioned problems of the prior art, the inventor of the present invention based on years of experience in the related industry to conduct extensive research and experiment, and finally developed a ball bar testing tune-up method for machine tool systems to overcome the problems of the prior art.

SUMMARY OF THE INVENTION

Therefore, it is a primary objective of the present invention to solve the aforementioned problems by providing a ballbar testing tune-up method for machine tool, and the method includes the steps of: letting a machine tool system execute a ballbar test; obtaining a phase characteristic and a peak-value characteristic according to the result of the ballbar test; creating a Lagrange interpolation polynomial, increasing an interpolation order thereof according to the number of ballbar tests, and inputting a corresponding servo controller parameter of the machine tool system each time when executing the ballbar test, and at least one of the phase characteristic and the peak-value characteristic; obtaining a proposed servo parameter accordingly; and inputting the proposed servo parameter to the machine tool system.

In the aforementioned ballbar testing tune-up method for machine tool, the phase characteristic is an average value of the difference between the radius sampled at a position of the X-axis and Y-axis with a contour error fixed cycle in the ballbar test result and an average radius of the ballbar test.

In the aforementioned ballbar testing tune-up method for machine tool, the peak-value characteristic is the difference of peak values at the X-axis and Y-axis in the ballbar test result.

In the aforementioned ballbar testing tune-up method for machine tool, the peak-value characteristic is defined by defining a sampling time based on the neighborhood of the peak values of the X-axis and Y-axis and using the sampling time as a filter range to calculate an average value of the peak values to perform a filtering, and using the difference between the peak values of the X-axis and Y-axis after the filtering as the peak-value characteristic.

In the aforementioned ballbar testing tune-up method for machine tool, the machine tool system includes a servo controller having a position loop, and the proposed servo parameter is inputted as a position controller parameter to the position loop.

In the aforementioned ballbar testing tune-up method for machine tool, the proposed servo parameter is obtained by inputting the phase characteristic into the Lagrange interpolation polynomial.

In the aforementioned ballbar testing tune-up method for machine tool, the machine tool system includes a servo controller having a velocity loop, and the proposed servo parameter is inputted as a controller parameter into the position loop.

In the aforementioned ballbar testing tune-up method for machine tool, the proposed servo parameter is obtained by inputting the phase characteristic and the peak-value characteristic into the Lagrange interpolation polynomial.

From the description and configuration as described above, the present invention obviously has the following advantages and effects:

1. The invention can be applied to a built-in optical ruler of a machine tool system directly to obtain the proposed servo parameter quickly when executing the ballbar test without requiring additional equipment, so that the cost of equipment can be reduced significantly. After the proposed servo parameter is obtained, it can be input to the machine tool system to improve the response of the servo system, reduce the manufacturing contour error, and enhance the working precision of the machine tool system.

BRIEF DESCRIPTION OF THE DRAWINGS

FIG. 2 is a key to the arrangement of the partial views of FIG. 2a and FIG. 2b.

FIG. 7c is a table of DBB measurement results after making adjustment in accordance with an empirical embodiment of the present invention;

FIG. 8a is a table of DBB measurement results when the feed rate is 1000 mm/min in accordance with an empirical embodiment of the present invention;

FIG. 8c is a table of DBB measurement results when the feed rate is 3000 mm/min in accordance with an empirical embodiment of the present invention;

FIG. 8e is a table of DBB measurement results when the feed rate is 8000 mm/min in accordance with an empirical embodiment of the present invention.

DESCRIPTION OF THE PREFERRED EMBODIMENTS

The technical characteristics of the present invention will become apparent with the detailed description of preferred embodiments accompanied with the illustration of related drawings.

Figure 1:
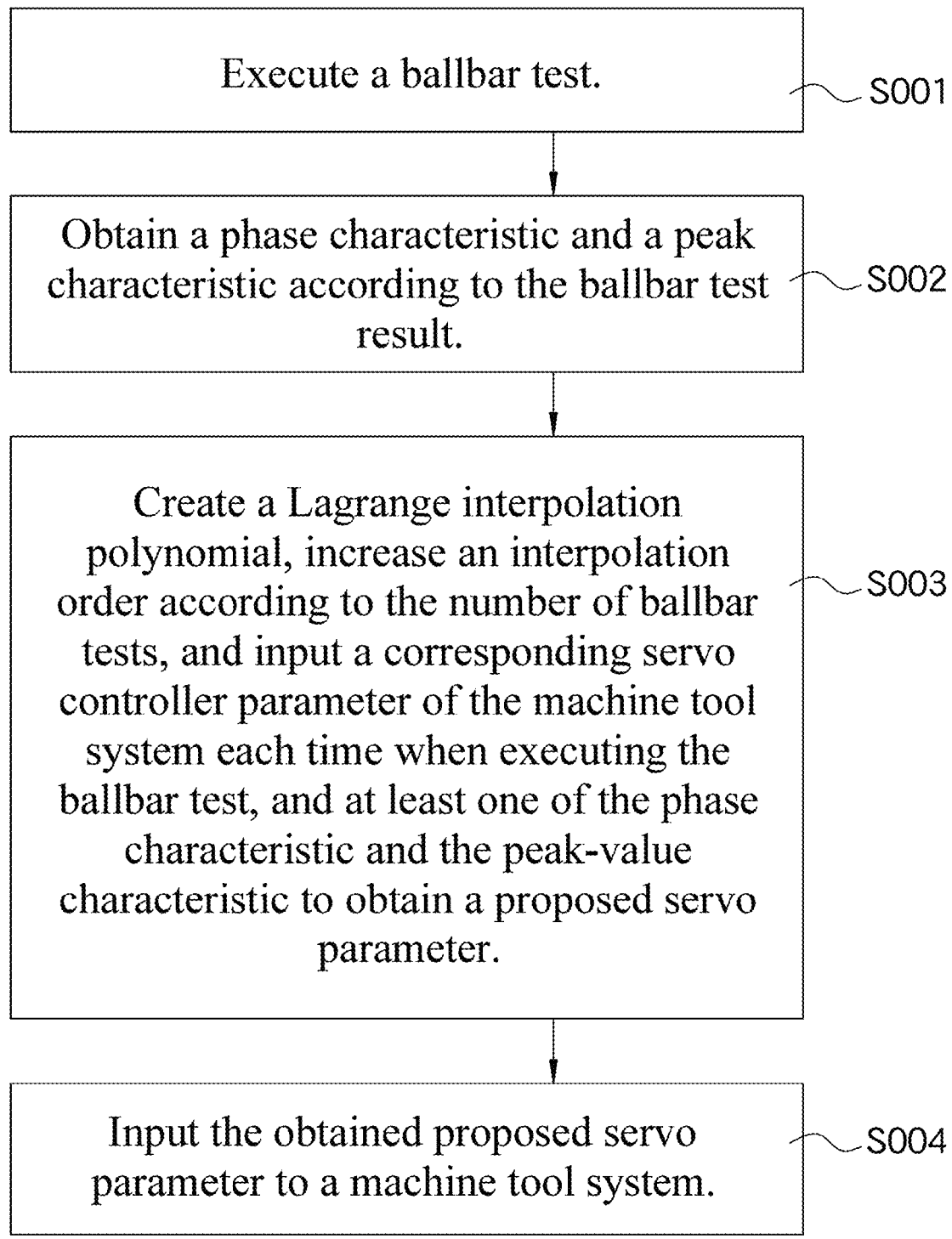
FIG. 1 is a flow chart of the present invention.
Figure 2A:
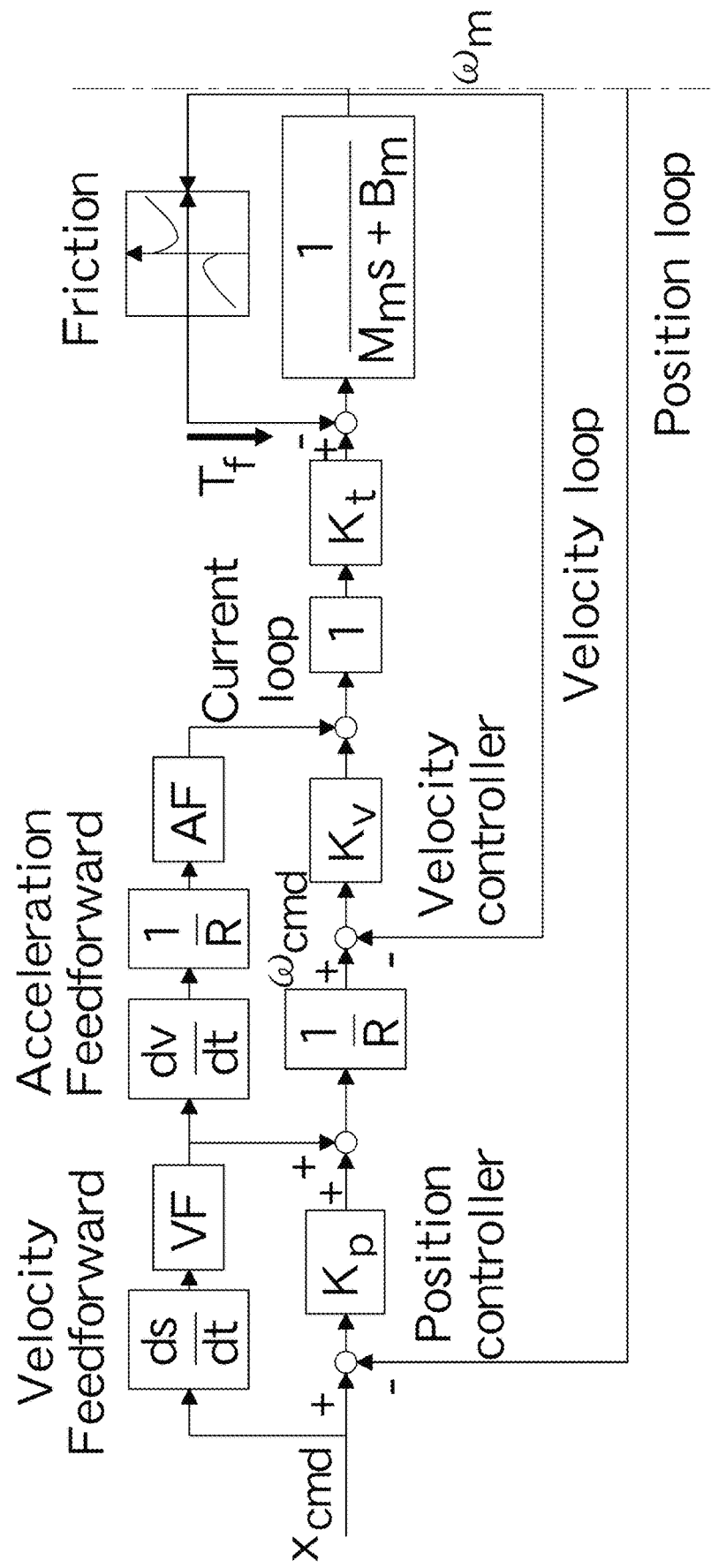
FIG. 2a is a part of a block diagram showing a model of a virtual feed shaft system of the present invention.
Figure 2B:
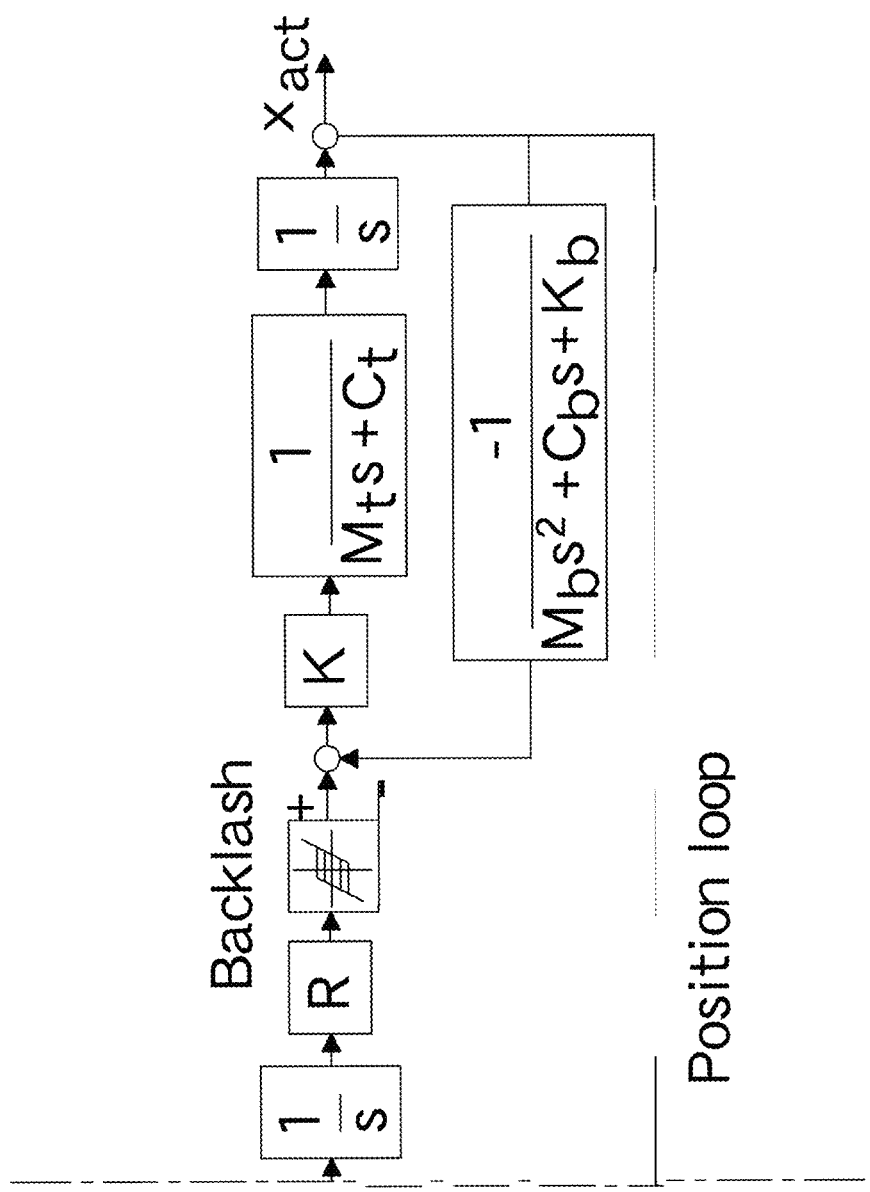
FIG. 2b is another part of a block diagram showing a model of a virtual feed shaft system of the present invention.

With reference to FIG. 1 for a ballbar testing tune-up method for machine tool in accordance with the present invention, the method includes the following steps:

S001: analyzing and calibrating a response error of a machine tool system, wherein sufficient data are required for the analysis, so that a virtual feed shaft model is created in an embodiment and used to consider the impact of the response error occurred in the system to create a ballbar test signal and sufficient data for the analysis, and the virtual feed shaft model includes a feed drive control system, and a feedforward controller system, whose configuration and model are prior arts, and thus will not be described here. In the feed system model of the present invention, the CNC servo loop comprises, a current loop, a velocity loop and a position loop arranged from inside to outside. To simplify the current loop of the present invention, the control block diagram of the model is as shown in FIG. 2a and FIG. 2b, wherein $K_v = K_{vi}/s + K_{vp}$ is the velocity loop of the proportional integral (PI) controller, $K_{vi}$ and $K_{vp}$ are the parameters of the servo controller, s is a Laplace operator, $K_p$ is the position loop of the proportional (P) controller, $$\frac{1}{M_i s + C_i}$$

and $$\frac{-1}{M_b s^2 + C_b s + K_b}$$

are the vibration models of the work table and base of the machine tool system respectively, $$\frac{1}{M_m s + B_m}$$

is the linear motor model with non-linear phenomenon (friction, backlash), VF、AF are the velocity and acceleration of the feedforward control system; and the modular machine tool system includes loop gains of each shaft, a linear controller, and a feedforward controller; wherein the virtual feed shaft system changes and adjusts the parameters to avoid serious damages to the machine tool system caused by the wrong controller parameters during the experiment and establish a rare single influence phenomenon in a real machine measurement, while effectively eliminating unnecessary influences and greatly reducing the cost of collecting measurement signal sampled. Therefore, the virtual feed shaft system as shown in FIG. 2a and FIG. 2b is provided for creating sufficient databases to analyze the influence of servo mismatch.

Then, the machine tool system executes the ballbar test. Since the servo mismatch comes from a response error between the X-axis and Y-axis of the machine tool system, and the frequency domain analysis can be used to know if there is a change of gain and phase in the system response, so that a ballbar test is executed in accordance with an embodiment of the present invention, and the original equipped optical ruler of the machine tool system is provided to perform the ballbar test. In the ballbar test, the gain difference and the phase difference between the two axes will cause a contour error of the time domain trajectory, and the control parameter of the PI controller will influence the changes of gain and phase of the feed system, so that if the gains or phases of the two axes are not consistent, then we can observe the contour error from the circular tracking. The circular tracking commands for the X-axis and Y-axis are given in the following Equations 1 and 2 respectively:

$$x = R \cos(\omega t) \quad \text{[Equation 1]}$$

$$y = R \sin(\omega t) \quad \text{[Equation 2]}$$

Wherein, R and $\omega$ are the radius and angular velocity of a ballbar test path respectively, and the angular velocity can be converted by the feed rate, and t is the measurement time of the ballbar test, and the time domain tracking of the machine tool system is given in the following Equations 3 and 4:

$$x = K_x \cdot R \cos(\omega t + \varphi_x) \quad \text{[Equation 3]}$$

$$y = K_y \cdot R \sin(\omega t + \varphi_y) \quad \text{[Equation 4]}$$

Wherein, $K_x$ and $K_y$ are the system gain values of the X-axis and Y-axis respectively, and $\varphi_x$ and $\varphi_y$ are the system phase values of the X-axis and Y-axis respectively, so that the circular measured radius r(t) can be calculated by the following Equation 5:

$$r(t) = R\sqrt{K_x^2(R\cos(\omega t + \varphi_x))^2 + K_y^2(R\sin(\omega t + \langle \varphi y))^2} \quad \text{[Equation 5]}$$

Based on the X-axis, the servo mismatch of the machine comes from the gain difference $\Delta\varphi$ and the phase difference $\Delta K$ of the two axes, which can be calculated by the following Equations 6 and 7.

$$\Delta\varphi = \varphi_y - \varphi_x \quad \text{[Equation 6]}$$

$$\Delta K = K_y - K_x \quad \text{[Equation 7]}$$

Figure 3A:
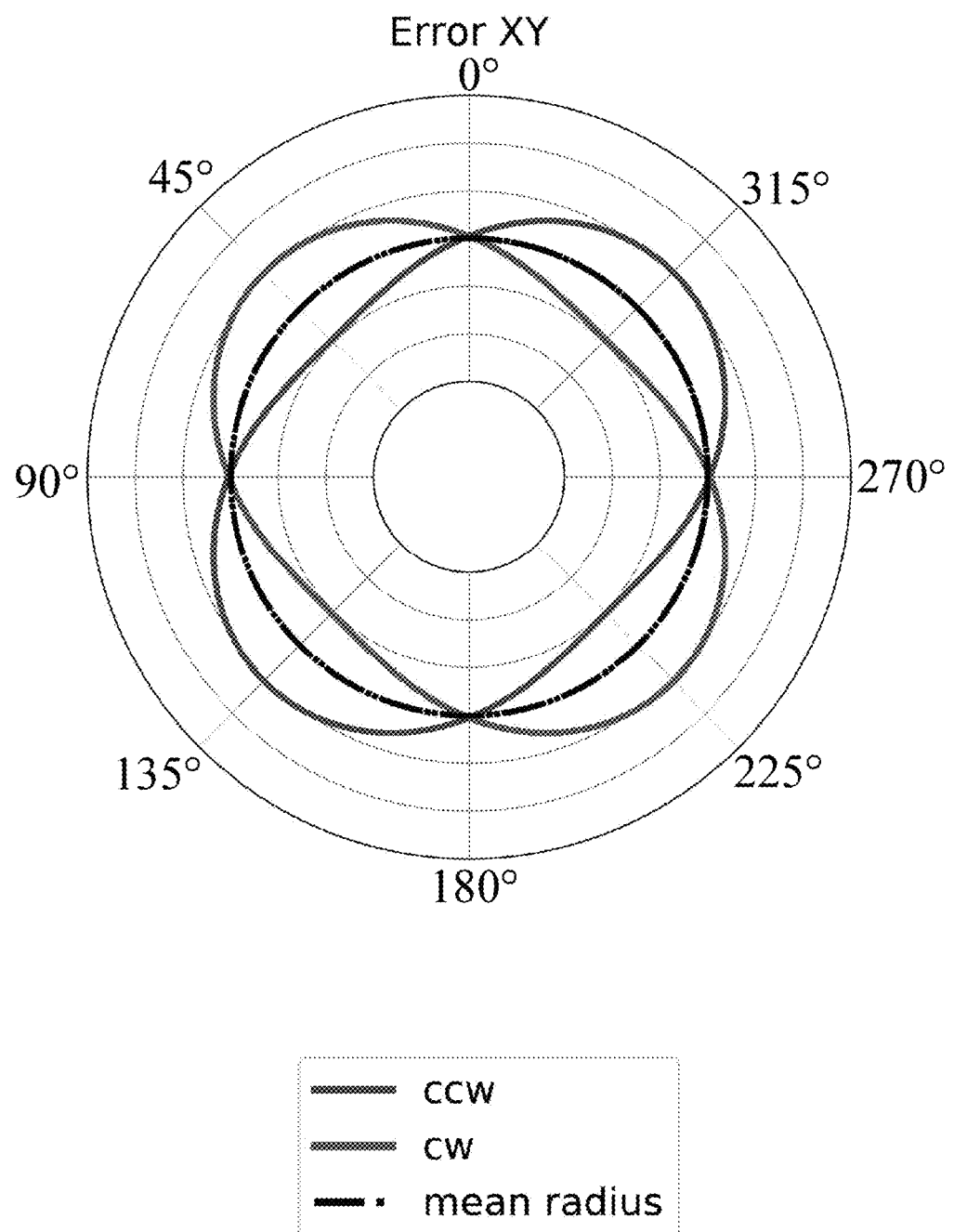
FIG. 3a is a polar coordinate graph showing the impact of phase error produced by the present invention, and the phase of Y-axis is ahead of the phase of X-axis.
Figure 3B:
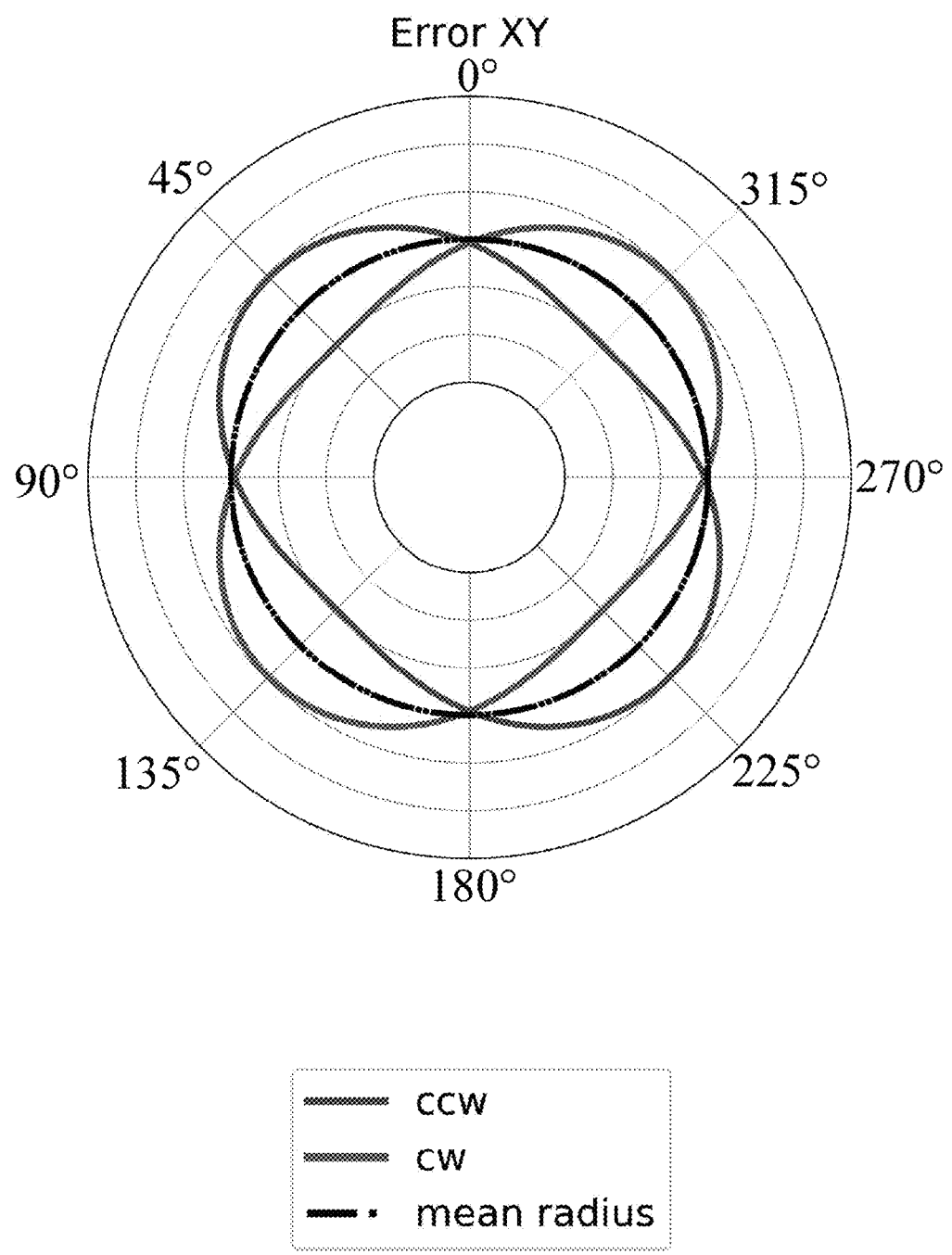
FIG. 3b is a polar coordinate graph showing the impact of phase error produced by the present invention, and the phase of Y-axis is behind the phase of X-axis.

If the phase difference $\Delta\varphi$ is greater than zero, the Y-axis phase is ahead of X-axis phase, so that we know from Equation 5 that when the cycle is t', the counterclockwise tracking radius is greater than an average radius $\overline{R}$; and the track has a clockwise radius smaller than the average radius as shown in FIG. 3 and the following Equation 8:

$$0 > t' > \frac{\pi}{2\omega}, \pi > t' > \frac{3\pi}{2\omega} \quad \text{[Equation 8]}$$

If $\Delta\varphi$ is greater than zero, it is as shown in the following Equation 9:

$$r_{ccw}(t') > \overline{R}, r_{cw}(t') < \overline{R} \quad \text{[Equation 9]}$$

If $\Delta\varphi$ is smaller than zero, it is as shown in the following Equation 10:

$$r_{ccw}(t') < \overline{R}, r_{cw}(t') > \overline{R} \quad \text{[Equation 10]}$$

Figure 4A:
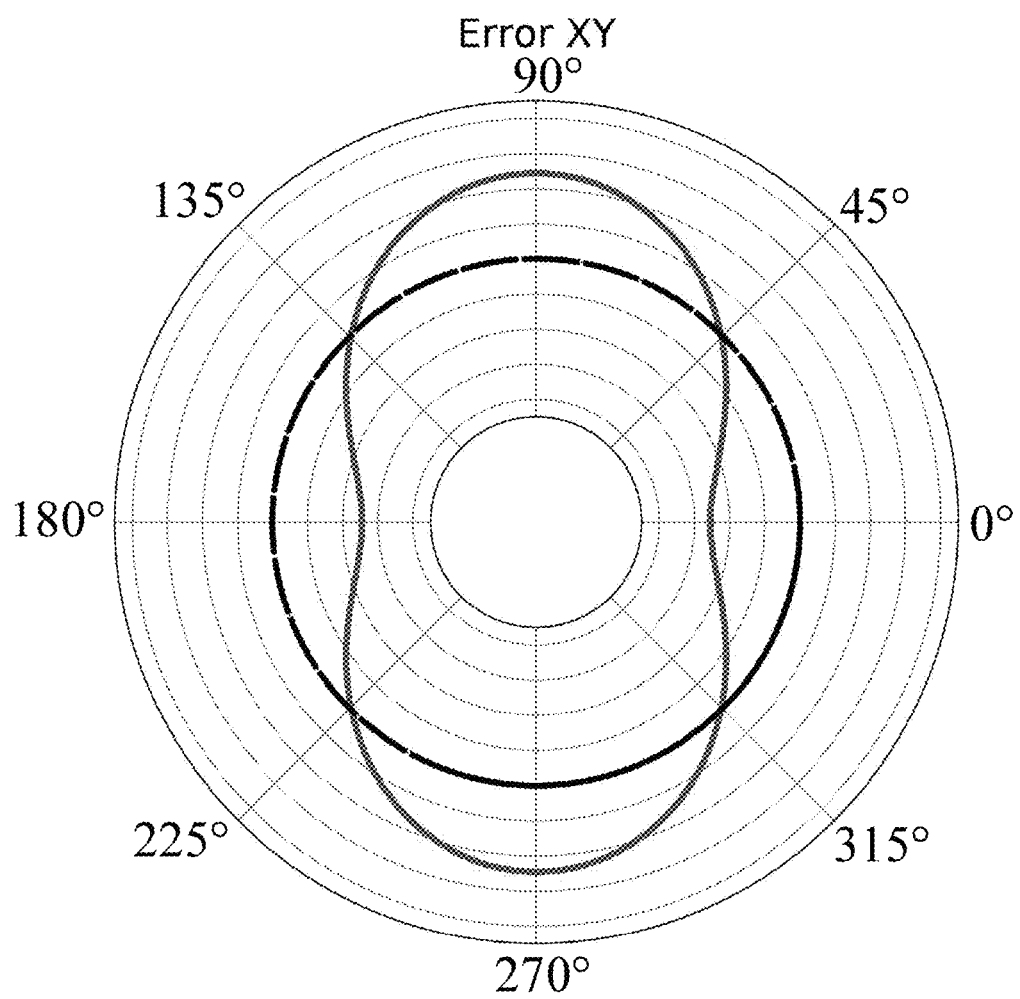
FIG. 4a is a polar coordinate graph showing the impact of gain error produced by the present invention, and the gain of Y-axis is greater than the gain of X-axis.
Figure 4A:
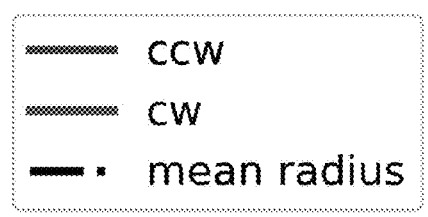
Figure 4B:
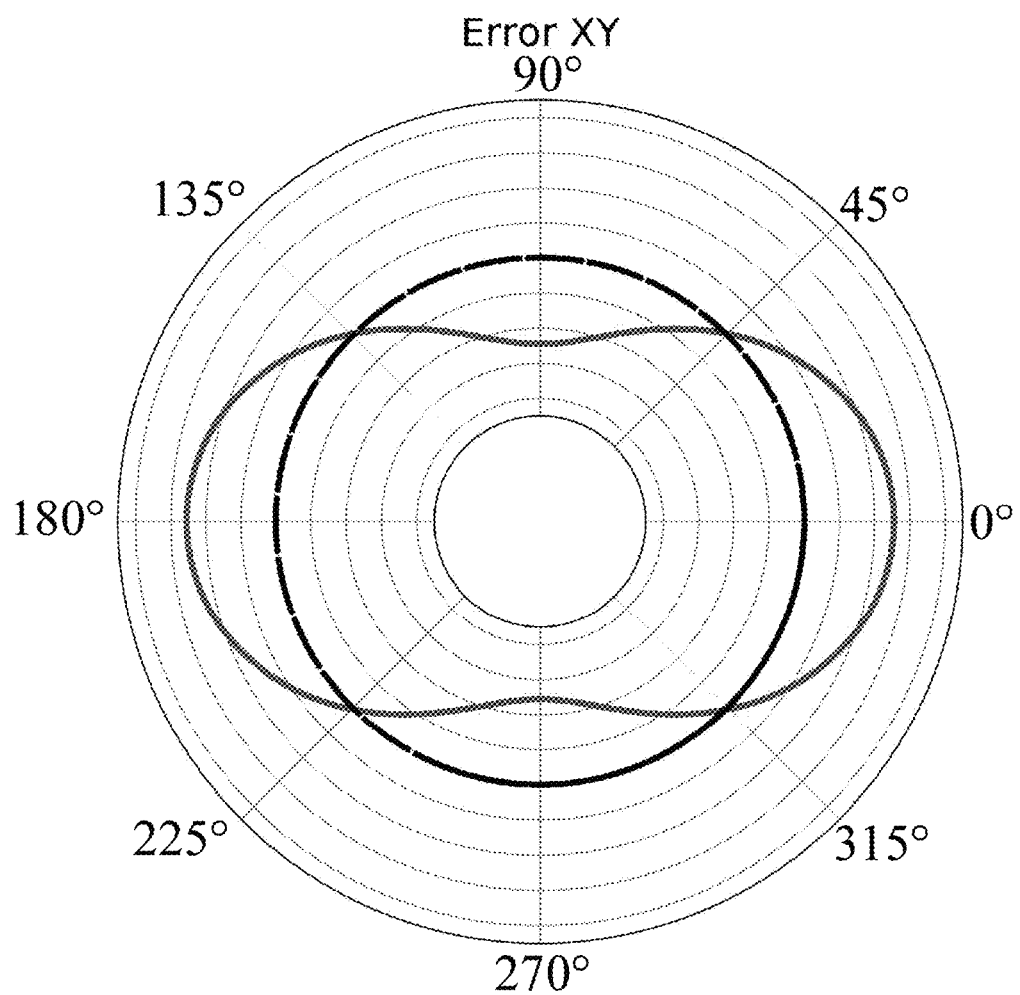
FIG. 4b is a polar coordinate graph showing the impact of gain error produced by the present invention, and the gain of Y-axis is smaller than the gain of X-axis.
Figure 5:
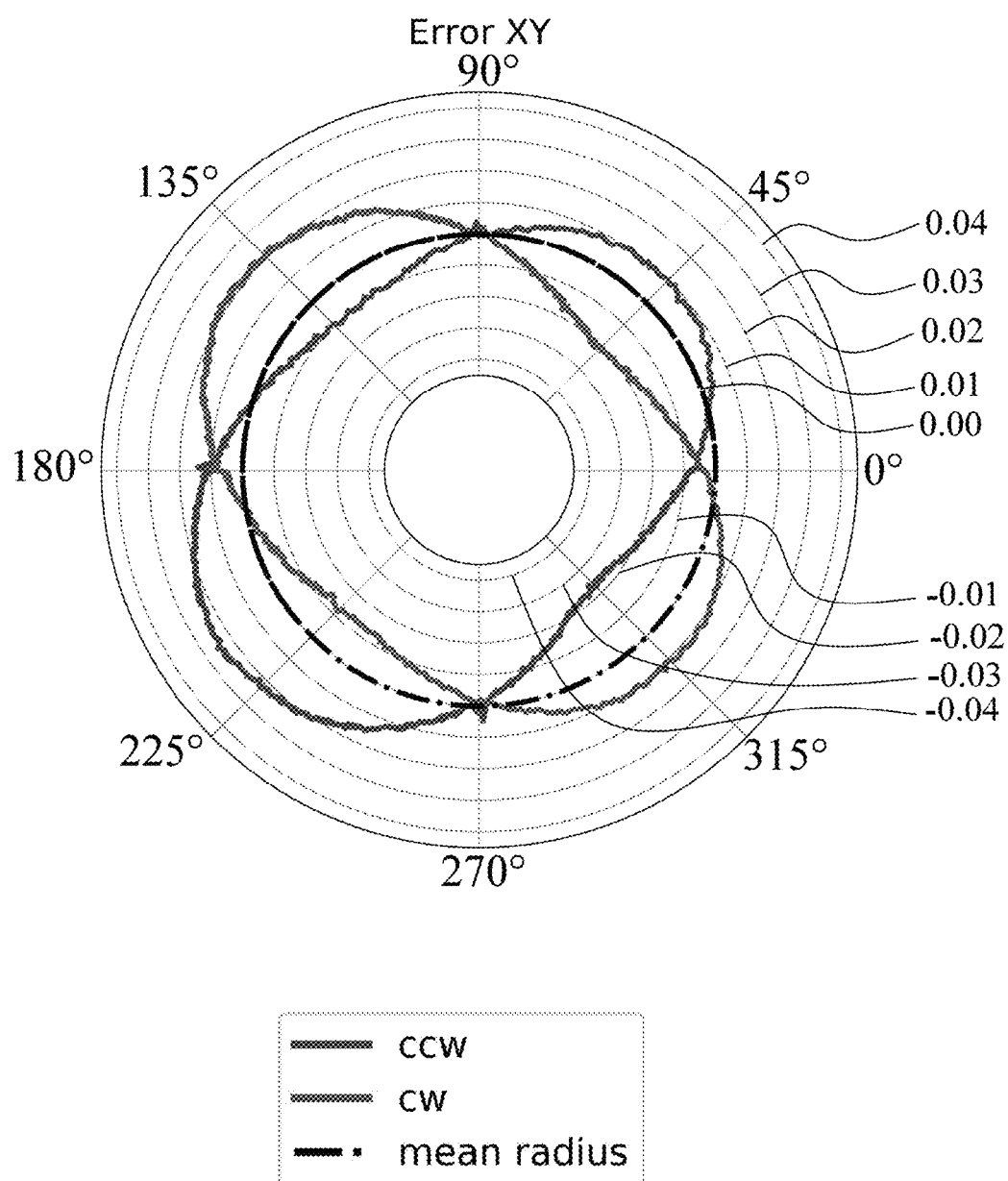
FIG. 5 is a polar coordinate graph of a ballbar test before making adjustment in accordance with an empirical embodiment of the present invention.

Therefore, if the gain difference $\Delta K$ is greater than zero, indicating that when the Y-axis gain value is greater than the X-axis gain value, we will be able to know from Equation 5 that if the cycle is from $$\frac{\pi}{4\omega}$$

to $$\frac{3\pi}{4\omega},$$

then the measurement track r(t) will be greater than $\overline{R}$, and if the cycle is from $$\frac{5\pi}{4\omega}$$

to $$\frac{7\pi}{4\omega},$$

then the measurement track r(t) will be smaller than $\overline{R}$; and if $\Delta K$ is smaller than zero, the conditions will be opposite as shown in FIG. 4.

S002: analyzing the servo mismatch to find the key impact and then avoiding errors caused by defective data by eliminating the low-impact segments, and calculating the important characteristics of major high-impact measurement segments. In the present invention, a phase characteristic and a peak-value characteristic can be obtained according to the ballbar test result.

In an embodiment, the phase characteristic is defined as an important segment of the ballbar test result obtained when X- and Y-axis phases are inconsistent to each other, causing a contour error synchronously outputted in the fixed cycle t' of the two axes, and the phase characteristic has better significance. When the phase error shows up, which axis is ahead or behind can be shown immediately. When $\hat{R}$ is greater than zero, it indicates that the Y-axis is ahead of X-axis, so that the counterclockwise measured radius is greater than an average radius in the cycle t'; and when $\hat{R}$ is smaller than zero, it indicates that the Y-axis is behind the X-axis, so that the counterclockwise measured radius is smaller than the average radius in the cycle t'. $\Delta t$ is the controller sampling time and $N_R$ is the number of characteristic calculations of segment sampling time; so that an average of the differences between the radius of contour errors occurred in the fixed cycle of the X-axis and Y-axis and the average radius of the ballbar test can be calculated according to the following Equations 11 to 13:

$$t' = \frac{\pi}{6\omega} \sim \frac{\pi}{3\omega} \quad \text{[Equation 11]}$$

$$N_R = \frac{\frac{\pi}{3\omega} - \frac{\pi}{6\omega}}{\Delta t} \quad \text{[Equation 12]}$$

$$\hat{R} = \frac{\sum (r(t') - \overline{R})}{N_R} \quad \text{[Equation 13]}$$

In the peak-value characteristic, the time domain peak values of the two axes are inconsistent with each other since the gains of the two axes are different, so that when ΔK is greater than zero, the motion trajectory in the ballbar test is as shown in FIG. 4. In the cycle from $$\frac{\pi}{4\omega}$$

to $$\frac{3\pi}{4\omega},$$

the measured radius track is greater than an average radius. The difference between the peak values of the X-axis and Y-axis is used as the peak-value characteristic $\hat{P}_e$. To reduce the impact of machine vibration and signal conversion, $N_p$ sampling time is obtained from the neighborhood of the peak value and used as a filter range $t_f$ in an embodiment, and the average value is calculated for filtering, and the difference between the peak values of the two axes is used as the peak-value characteristic $\hat{P}_e$. When $\hat{P}_e$ is greater than zero, it indicates that the gain value of the Y-axis is greater than the gain value of the X-axis; when $\hat{P}_e$ is smaller than zero, it indicates that the gain value of the Y-axis is smaller than the gain value of X-axis; which can be calculated by the following Equations 14 to 17:

$$t_f = N_p \cdot \Delta t \quad \text{[Equation 14]}$$

$$t'_x = \frac{2\pi}{\omega} \pm t_f \quad \text{[Equation 15]}$$

$$t'_y = \frac{2\pi}{\omega} \pm t_f \quad \text{[Equation 16]}$$

$$\hat{P}_e = \frac{\left|\sum y(t'_y)\right| - \left|\sum x(t'_x)\right|}{N_p + 1} \quad \text{[Equation 17]}$$

S003: finding an important characteristic under the system response error, and then creating a Lagrange interpolation polynomial for the calculation to obtain a proposed servo parameter and provide a proposed controller parameter to the operators. To improve the accuracy and convergence of the algorithm, the order of interpolation is increased according to the number K of performing the ballbar tests, the servo controller parameter of the machine tool system and at least one of the phase characteristic and the peak-value characteristic are inputted accordingly for the execution of the ballbar test each time, so as to obtain the proposed servo parameter, and its calculation is shown in the following Equations 18 to 20, wherein $p_i^k$ is the servo controller parameter, and $F_i$ is the selected characteristic.

$$f(F_i^k) = p_i^k = 1, 2 \ldots, n \quad \text{[Equation 18]}$$

$$[p_1, p_2, p_3 = k_{pp}, k_{vp}, k_{vi}] \quad \text{[Equation 19]}$$

$$[F_1, F_2] = [\hat{R}, \hat{P}_e] \quad \text{[Equation 20]}$$

After the first ballbar tests of different parameters are performed, a single record of track measurement data and controller parameters have not create the Lagrange interpolation polynomial yet, so that the parameter range between $p_{i,max}^g$ and $p_{i,min}^g$ of the controller, the controller parameter $p_i^1$, the phase characteristic $\hat{R}_1$ of the first ballbar test calculated after the first ballbar test are given to the position controller parameter proposed value $p_1^2$ of the second ballbar test. The calculation method used after the first circular measurement is shown in the following Equations 21 and 22, wherein the controller parameters of the axes having the gain ahead or the phase behind are adjusted, or the controller parameters of the axes having both of the gain and phase ahead are adjusted:

$$p_i^2 = p_i^1 + \frac{\hat{R}_1}{R_{max} - R_{min}} \times (p_{i,max}^g - p_{i,min}^g) \quad \text{[Equation 21]}$$

$$p_i^2 = p_i^1 - \frac{\hat{R}_1}{R_{max} - R_{min}} \times (p_{i,max}^g - p_{i,min}^g) \quad \text{[Equation 22]}$$

After the second ballbar test is executed, the important characteristic $F_2$ of the second is obtained, and the phase characteristic $F_3$ of the next ballbar test is zero, and the third position controller parameter $p_1^3$ is calculated. The calculation method after the second circular measurement is as shown in Equation 23:

$$p_i^3 = \frac{p_i^2 F_1 - p_i^1 F_2}{F_1 - F_2} \quad \text{[Equation 23]}$$

After the controller parameter $p_1^3$ is used in the third ballbar test to calculate $\hat{R}_3$, and $\hat{R}_4$ is set to zero to calculate the fourth proposed parameter $p_1^4$. The calculation method after the third circular measurement is as shown in Equation 24:

$$p_i^4 = \frac{p_i^1 F_2 F_3 (F_2 - F_3) - p_i^2 F_1 F_3 (F_1 - F_3) + p_i^3 F_1 F_2 (F_1 - F_2)}{(F_1 - F_2)(F_2 - F_3)(F_1 - F_3)} \quad \text{[Equation 24]}$$

After the controller parameter $p_1^3$ is used in the third ballbar test to obtain $F_3$, and $F_4$ is set to zero to calculate the fourth proposed parameter $p_1^4$. The calculation method of the fourth circular measurement is as shown in Equations 25 to 29:

$$p_i^5 = \frac{p_i^1 a_1 + p_i^2 a_2 - p_i^3 a_3 + p_i^4 a_4}{(F_1 - F_2)(F_2 - F_3)(F_1 - F_2)(F_3 - F_4)(F_1 - F_3)(F_1 - F_4)(F_2 - F_4)} \quad \text{[Equation 25]}$$

$$a_1 = F_2 F_3 F_4 (F_2 - F_3)(F_2 - F_4)(F_3 - F_4) \quad \text{[Equation 26]}$$

$$a_2 = F_1 F_3 F_4 (F_1 - F_3)(F_1 - F_4)(F_3 - F_4) \quad \text{[Equation 27]}$$

$$a_3 = F_1 F_2 F_4 (F_1 - F_2)(F_1 - F_4)(F_2 - F_4)$$ [Equation 28]

$$a_4 = F_1 F_2 F_3 (F_1 - F_2)(F_1 - F_3)(F_2 - F_3)$$ [Equation 29]

The order of the created Lagrange interpolation polynomial increases with the number k of ballbar tests, so that after the $n^{th}$ ballbar test, the calculation of the Lagrange interpolation polynomial is as shown in Equations 30 and 31. Assumed that the selected characteristic is set to zero, the proposed servo parameter is calculated.

$$L_{n,k}(0) = \frac{(0 - \hat{F}_1)(0 - \hat{F}_2) \ldots (0 - \hat{F}_{k-1})(0 - \hat{F}_{k+1}) \ldots (0 - \hat{F}_n)}{(\hat{F}_k - \hat{F}_1)(\hat{F}_k - \hat{F}_3) \ldots (\hat{F}_k - \hat{F}_{k-1})(\hat{F}_k - \hat{F}_{k+1}) \ldots (\hat{F}_k - \hat{F}_n)}$$ [Equation 30]

$$p_i^{n+1} = p_i^1 L_{n,1}(0) + \ldots + p_i^n L_{n,n}(0) = \sum_{k=1}^{n} p_i^k L_{n,k}(0)$$ [Equation 31]

S004: Since the machine tool system uses an AC servomotor for the control, and a position controller, a velocity controller and a feedforward controller are used for the control, therefore the selection of the servo controller parameter is very important. Therefore, the present invention can input the proposed servo parameter into the machine tool system to adjust the controller parameter, and further improve its manufacturing precision. The present invention further provides a servo adjustment method for improve the contour precision of machine tools. A ballbar test is used to obtain the track of an optical ruler, and the aforementioned method is used for the key impact measurement segment, and the Lagrange interpolation is used to obtain the proposed servo parameter, and a parameter adjustment stop condition, a position controller parameter ($K_{pp}$), and a velocity controller parameter ($K_{vp}$, $K_{vi}$) are set to improve the machine response errors.

To improve the precision of adjusting the servo machine, the following steps are carried out before adjusting the servo parameters:

1. Determining the axis with the response behind: To avoid insufficient gain of the two axes occurred during the manufacture performed at a feed rate higher than the measured feed rate caused by a too large decrease of the frequency width of the machine after making the adjustment, it is necessary to determine the phase or gain of which axis falls behind, and adjust the servo parameter of such axis. After the parameter reaches the range of its limits, the servo controller parameter of the other axis is adjusted.
2. Turning of the feedforward controller: Since the feedforward controller will have impact on the system response, therefore it is necessary to turn off the feedforward controller first, and then turn on the feedforward controller after the system adjustment has been made, in order to avoid any wrong proposed parameter calculated by the poor servo system adjustment method of the feedforward controller.

For the adjustment of the position loop parameter, in the first stage, $K_{pp}$ has a larger impact on the system phase and gain, so that the characteristic $\hat{R}$ with better convergence and significant phase is selected, and the aforementioned Lagrange interpolation is used to obtain the proposed servo parameter for adjusting the position controller parameter $K_{pp}$, and the goals are to minimize the phase characteristic to obtain better response performance and improve the servo mismatching issue. Since the phase characteristic $\hat{R}$ uses segment average for the calculation, therefore some gain errors may remain in the final convergence, and the radius measurement segment is symmetrically oriented at 45 degrees, thus leading to the result of $\hat{R}$ being close to zero.

For the adjustment of the velocity loop parameter, the gain characteristic $\hat{P}_e$ is used in the second stage, and the aforementioned Lagrange interpolation is used to obtain the proposed servo parameter to adjust the velocity controller parameter $K_{vp}$, and improve the system gain error; and then the velocity controller parameter $K_{vi}$ is adjusted. To avoid an unstable system resulted from a too-small change of the system response caused by the velocity controller parameter $K_{vg}$ and a too-large error of the calculation of the Lagrange difference, a phase characteristic $\hat{R}$ with better convergence is used as the calculation characteristic and the abovementioned adjustment is made.

[Stop Condition]

To shorten the system adjustment time and avoid the occurrence of wrong controller parameters that may cause huge vibration and damage to the machine tool system, the stop condition of the algorithm is set as follows:

1. Parameter Convergence: If the proposed controller parameter is equal to the control parameter of the previous ballbar test rounded up to an integer, the system is considered to be convergent, and the current adjustment of the servo parameter is completed.
2. Achieving the Goal of System Adjustment: The goal of system adjustment is set, and if the roundness after the ballbar test is smaller than 10 μm, then the goal is considered to be adjusted, and the servo system adjustment is completed and in compliance with the industrial system adjustment standards.
3. Reaching the parameter adjustment limits: During the process of adjusting physical systems, the system response error is not only due to the impact of the servo controller parameter, but when there is a possibility of having another error source that affects the calculation of the algorithm and results in a proposed control parameter exceeding the proposed range of the parameter. These situations indicate that the adjustment of the machine tool system parameter has reached its limit, so that the value closest to the proposed control parameter is selected from the parameter proposed range as the proposed control parameter.

Empirical Embodiment

In the present invention, the proposed servo parameter obtained from the aforementioned method and the created servo system adjustment system are applied to physical machines such as the CHMER three-axis machine tool for the calibration of servo parameters of the physical systems, and the experiment form is shown in the following Table 1, and a Double Ball Bar (DBB) measuring instrument is provided for the measurement verification before and after adjusting the parameter.

TABLE 1

| Measured Plane | Plain XY |
|---|---|
| Measured feed rate | 3000 mm/min |
| Measured radius | 100 mm |

Figure 6:
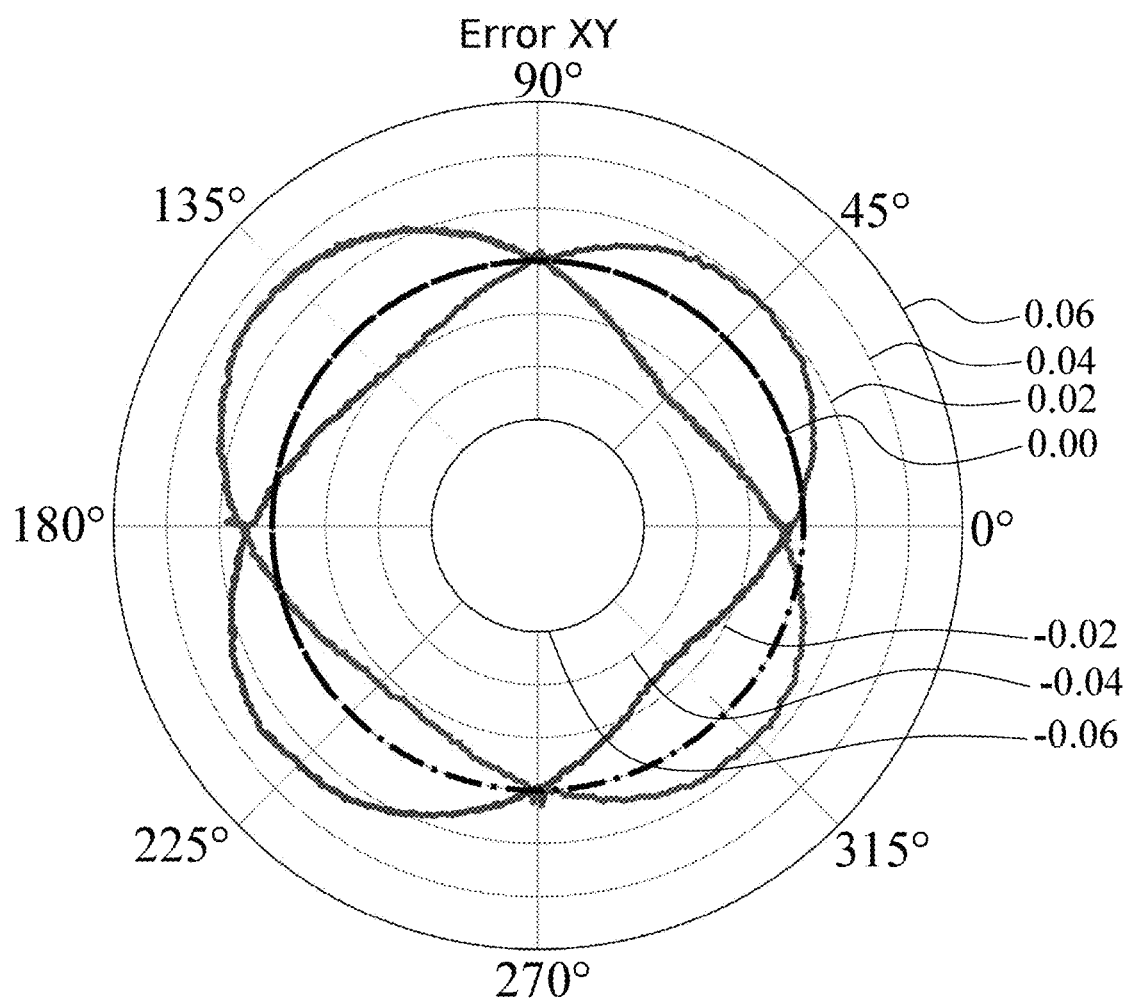
FIG. 6 is a polar coordinate graph of a ballbar test before making adjustment and turning off a feedforward controller in accordance with an empirical embodiment of the present invention.
Figure 7A:
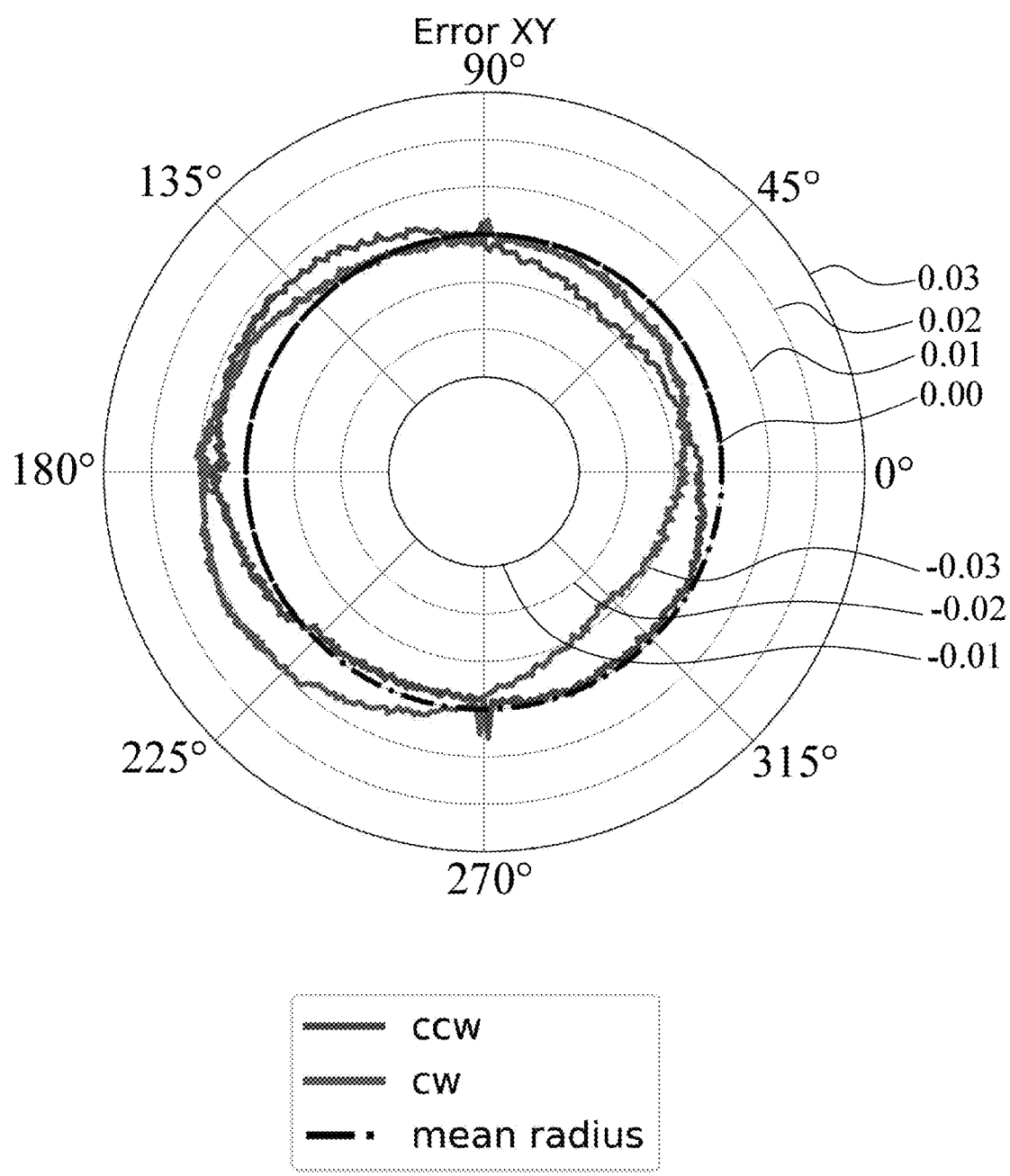
FIG. 7a is a polar coordinate graph of a ballbar test before adjusting a position loop parameter in accordance with an empirical embodiment of the present invention.
Figure 7B:
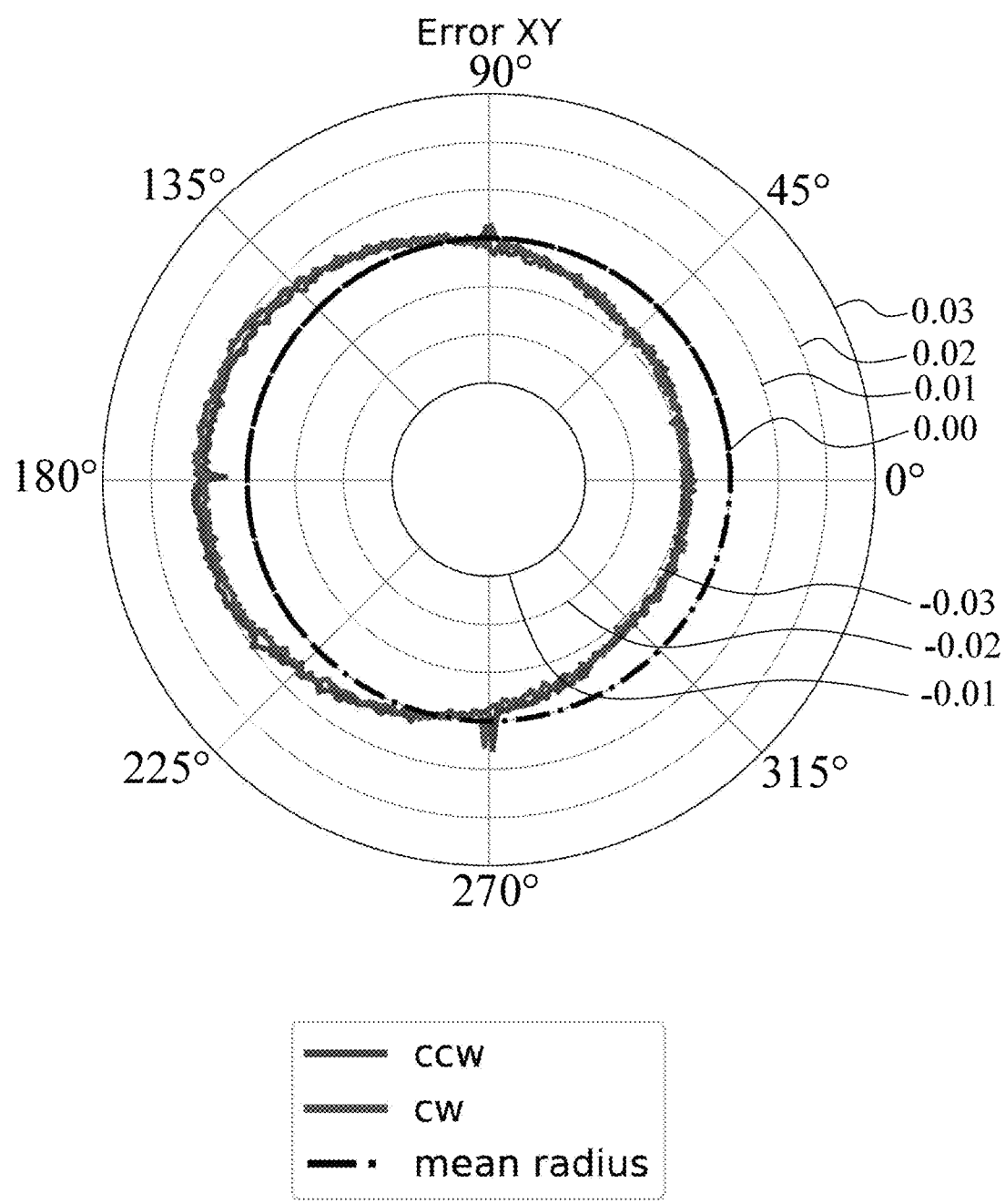
FIG. 7b is a polar coordinate graph of a ballbar test after adjusting a position loop parameter in accordance with an empirical embodiment of the present invention.
Figure 7D:
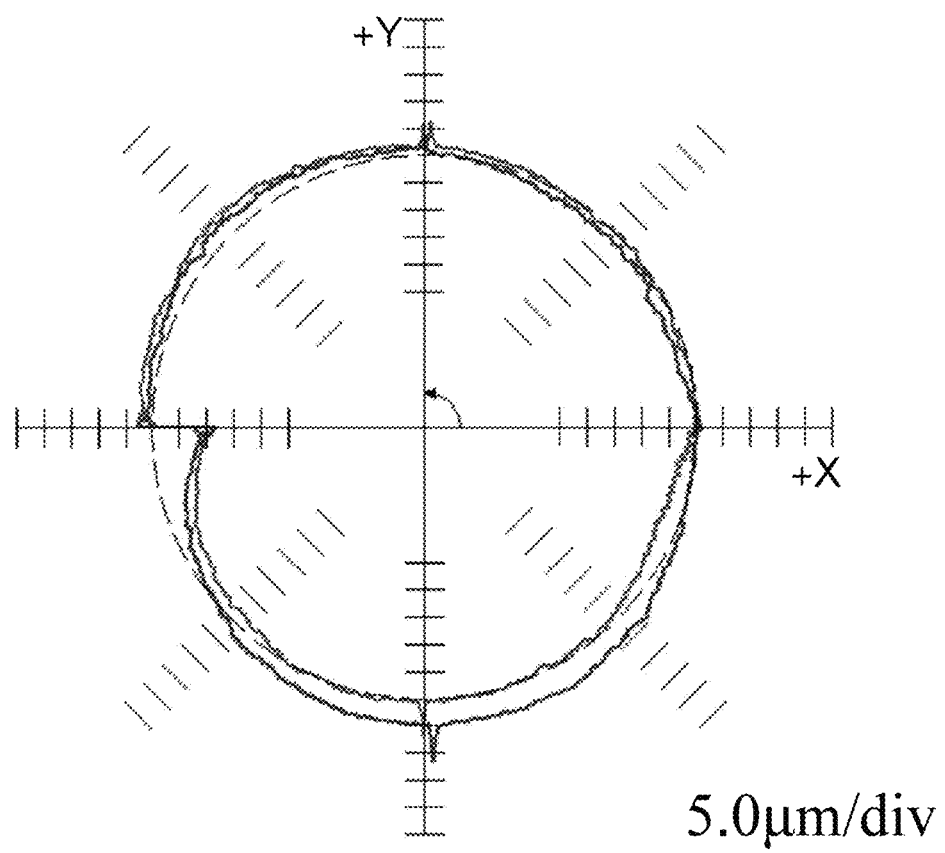
FIG. 7d is a graph of DBB measurement results after making adjustment in accordance with an empirical embodiment of the present invention.
Figure 8B:
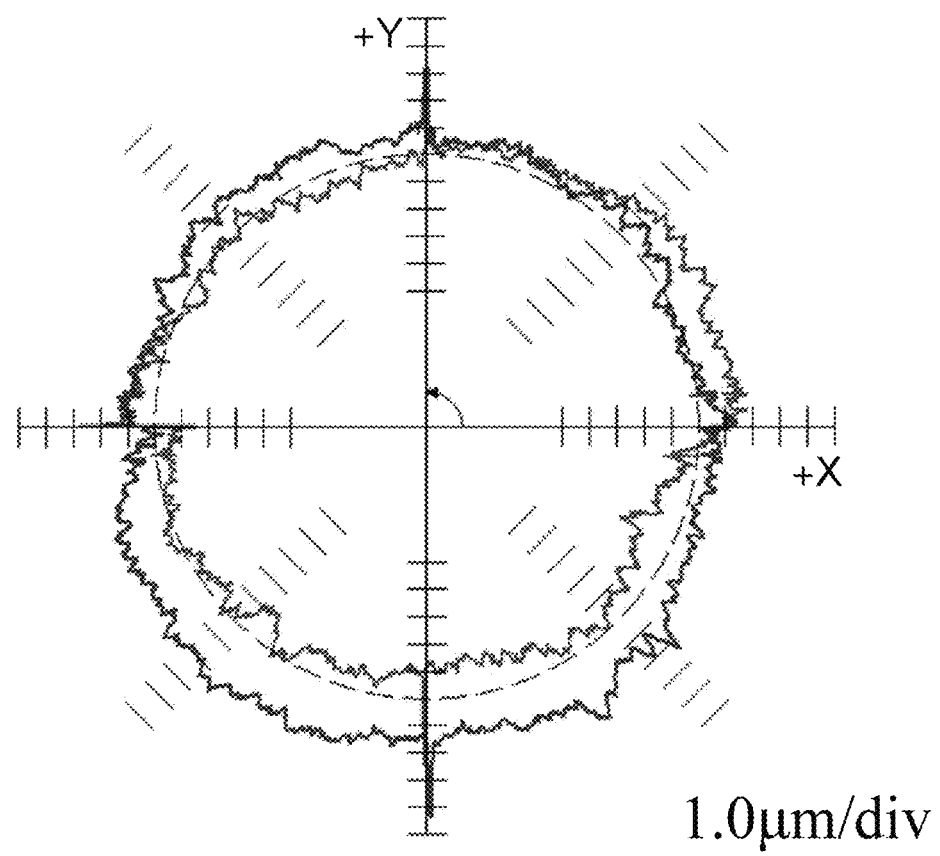
FIG. 8b is a graph of DBB measurement results when the feed rate is 1000 mm/min in accordance with an empirical embodiment of the present invention.
Figure 8D:
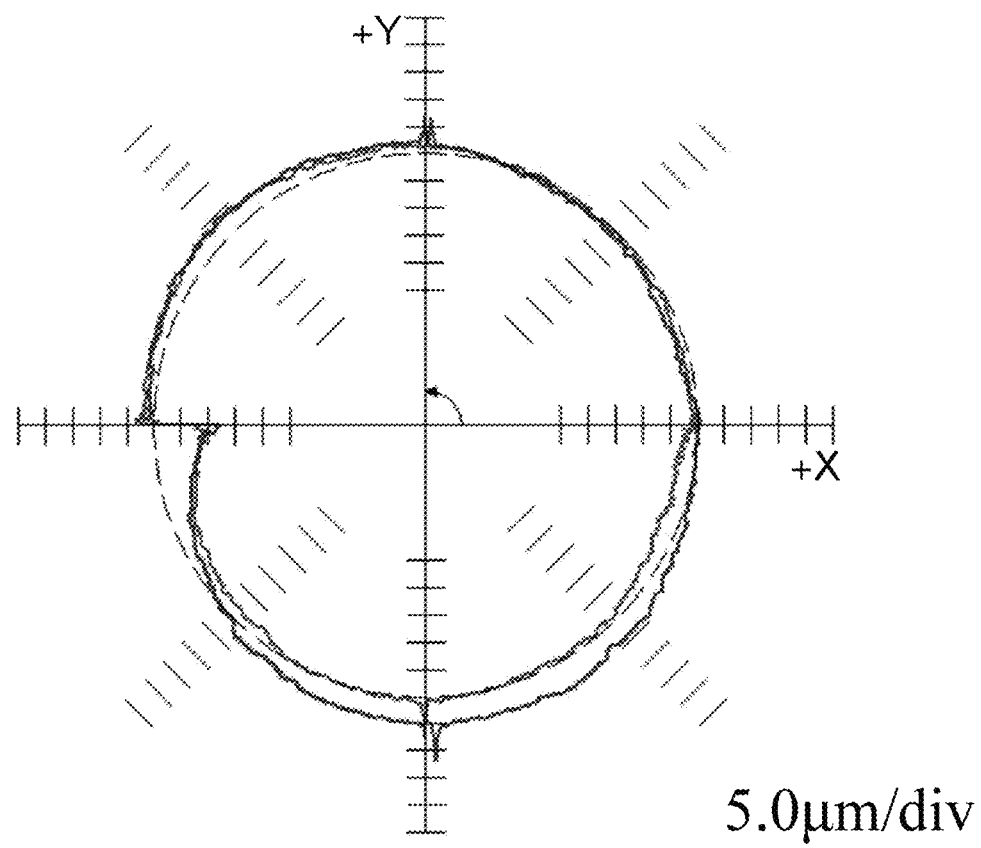
FIG. 8d is a graph of DBB measurement results when the feed rate is 3000 mm/min in accordance with an empirical embodiment of the present invention.
Figure 8F:
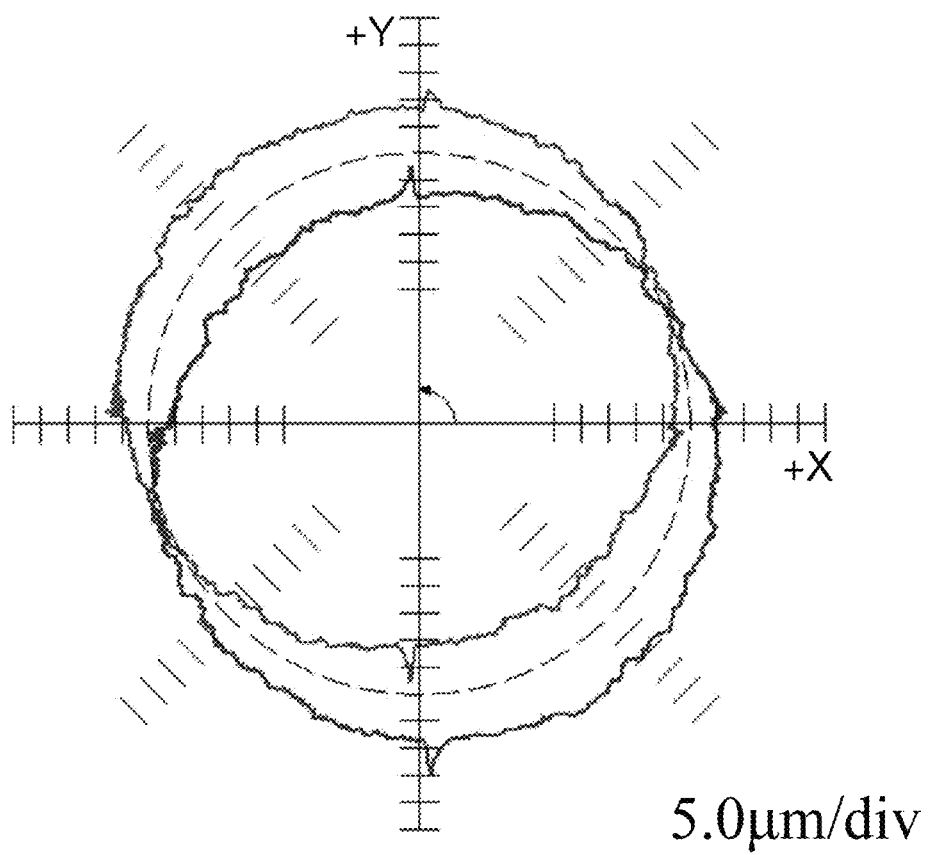
FIG. 8f is a graph of DBB measurement results when the feed rate is 8000 mm/min in accordance with an empirical embodiment of the present invention.

Since the feedforward controller will reduce the impact of the parameters to the response of the system, and a wrong feedforward controller parameter will cause system response errors, therefore the feedforward controller does not adjust its parameter. Before making a servo adjustment, the feedforward controller parameter is turned off to reduce the impact to the system response, and then a circular measurement is carried out to draw a polar coordinate image as shown in FIG. 6, and the machine adjustment is performed according to the adjusting procedure to improve the response matching of the internal loops of the controller. After the machine adjustment is completed, the feedforward controller is turned on as shown in FIG. 7a to FIG. 7d to perform DBB verification with different feed rates as shown in FIG. 8a to FIG. 8f. Since the machine tool system has other errors that impact the roundness. However, we still can see the effect of servo mismatch is close to zero under different feed rates, thereby proving the effectiveness of the present invention.

While the invention has been described by means of specific embodiments, numerous modifications and variations could be made thereto by those skilled in the art without departing from the scope and spirit of the invention as set forth in the claims.

What is claimed is:

1. A method for calibrating a Computer Numerical Control Machine (CNC Machine), the method comprising:
   providing a CNC Machine, the CNC Machine including:
      a tool head;
      at least two servomotors corresponding to at least two orthogonal directions of movement of the tool head, and a first direction of movement is defined as a first axis and a second direction of movement is defined as a second axis;
      a servocontroller for controlling a corresponding one of each of the at least two servomotors, each servocontroller including at least a position controller and a velocity controller coupled thereto;
      a processor; and
      an optical ruler coupled to the processor;
   executing a plurality of ballbar tests using the optical ruler as a measurement tool for determining which of the two orthogonal directions of movement has a response characteristic less than that of the other, wherein execution of each ballbar test includes:
      actuating each servocontroller to control a corresponding one of each of the at least two servomotors to selectively move the tool head in at least a portion of a circular path with respect to the at least two orthogonal axes; and
      obtaining a phase characteristic and a peak-value characteristic with respect to a tracking result with respect to the at least a portion of a circular path, wherein the phase characteristic is an average value of a difference between a radius sampled at a position of the first axis and the second axis with a contour error fixed cycle in a corresponding ballbar test and an average radius of the corresponding ballbar test, wherein the peak-value characteristic is a difference of peak values at the first axis and the second axis in the corresponding ballbar test;
   generating a Lagrange interpolation polynomial subsequent to execution of each ballbar test, and increasing an interpolation order of a corresponding Lagrange interpolation polynomial according to a number of executed ballbar tests, and inputting at least into a corresponding Lagrange interpolation polynomial a servo controller parameter of a servocontoller of a respective servomotor associated with a corresponding ballbar test and at least one of the phase characteristic and the peak-value characteristic associated with the corresponding ballbar test for generation of a proposed servo parameter; and
   inputting the proposed servo parameter into the processor for selectively actuating the at least one of a position controller or a velocity controller of a respective servocontroller of a corresponding servomotor to appropriately compensate the corresponding response characteristic in the respective direction of movement, thereby improving a contour precision of the tool head of the CNC Machine.

2. The method according to claim 1, wherein the peak-value characteristic with respect to the tracking result with respect to the at least a portion of a circular path is, further, defined by defining a sampling time based on a neighborhood of the peak values of the first axis and the second axis associated with a corresponding ballbar test, and the sampling time is operated upon to define a filter range for calculating an average value of the peak values associated with the corresponding ballbar test to perform a filtering operation, and the difference between the peak values of the first axis and the second axis associated with the ballbar test subsequent to the filtering operation defines the peak-value characteristic.

3. The method according to claim 1, wherein each servo controller includes a position loop, and the proposed servo parameter is inputted as a position controller parameter into the position loop.

4. The method according to claim 3, wherein the proposed servo parameter is generated by inputting the phase characteristic associated with a corresponding ballbar test into the Lagrange interpolation polynomial.

5. The method according to claim 1, wherein each servo controller includes a velocity loop, and the proposed servo parameter is inputted as a controller parameter into the velocity loop.

6. The method according to claim 5, wherein the proposed servo parameter is generated by inputting the phase characteristic and the peak-value characteristic associated with a corresponding ballbar test into the Lagrange interpolation polynomial.

* * * * *